(12) United States Patent
Hangleiter

(10) Patent No.: US 7,201,547 B2
(45) Date of Patent: Apr. 10, 2007

(54) OPENING ACTUATOR FOR COLLET CHUCK

(75) Inventor: Eugen Hangleiter, Hermaringen (DE)

(73) Assignee: Rohm GmbH, Sontheim (DE)

( * ) Notice: Subject to any disclaimer, the term of this patent is extended or adjusted under 35 U.S.C. 154(b) by 367 days.

(21) Appl. No.: 10/728,116

(22) Filed: Dec. 4, 2003

(65) Prior Publication Data

US 2004/0156690 A1 Aug. 12, 2004

(30) Foreign Application Priority Data

Dec. 6, 2002 (DE) .............................. 102 57 336

(51) Int. Cl.
*B23B 31/30* (2006.01)
(52) U.S. Cl. ...................... 409/233; 279/4.12; 279/134
(58) Field of Classification Search ................ 409/231, 409/233, 157; 279/4.12, 4.1, 134, 4.11; 91/406; 92/85 R, 143; *B23Q 3/12; B23B 31/30, B23B 31/24*
See application file for complete search history.

(56) References Cited

U.S. PATENT DOCUMENTS

| | | | | |
|---|---|---|---|---|
| 3,023,675 | A | * 3/1962 | Stephan | ...................... 409/233 |
| 3,267,815 | A | * 8/1966 | Ortman et al. | ................... 91/26 |
| 3,388,634 | A | * 6/1968 | Madland | ......................... 91/26 |
| 3,805,672 | A | * 4/1974 | Pekrul | .......................... 91/396 |
| 4,008,646 | A | * 2/1977 | Hague et al. | ................. 409/233 |
| 4,458,717 | A | * 7/1984 | Boland | ........................ 137/496 |
| 4,537,410 | A | 8/1985 | Hiestand | |
| 5,052,866 | A | * 10/1991 | Bauch et al. | ................ 409/233 |
| 5,096,347 | A | * 3/1992 | Kumagai et al. | ............ 409/233 |
| 5,782,586 | A | 7/1998 | Geissler | |
| 5,865,578 | A | 2/1999 | Benedikter | |

FOREIGN PATENT DOCUMENTS

| | | |
|---|---|---|
| DE | 3533623 A1 * | 4/1987 |
| DE | 41 38 974 | 6/1993 |
| DE | 299 21 999 | 3/2000 |
| DE | 299 22 642 | 3/2000 |

\* cited by examiner

*Primary Examiner*—Daniel W. Howell
(74) *Attorney, Agent, or Firm*—Andrew Wilford

(57) ABSTRACT

A chuck actuator has a hollow housing having a chamber and having a front end and a rear end. A ring in the chamber forms with the front end thereof a front compartment and a piston in the chamber between the ring and the rear end forms an intermediate compartment with the ring and a rear compartment with the rear end. A stem on the piston projecting forward through the ring and through the intermediate and front compartments is adapted to engage and open a chuck and is formed with a region of enlarged diameter. The piston is shiftable between a rear position with the enlarged-diameter region offset rearward from the ring and with the stem forming with the ring an axially extending passage between the front and intermediate compartments and a front position with the enlarged-diameter portion fitting snugly in the ring and substantially closing the passage.

8 Claims, 3 Drawing Sheets

OPENING ACTUATOR FOR COLLET CHUCK

FIELD OF THE INVENTION

The present invention relates to collet chuck. More particularly this invention concerns a device for opening a collet chuck so a tool or workpiece can be removed from or knocked out of it.

BACKGROUND OF THE INVENTION

A standard collet chuck for attachment to a mounting collar of a tool or workpiece has as described in German patent documents 4,138,974 of E. Brangs and F. Kuckelsberg and 299 22 642 and in U.S. Pat. No. 5,865,578 a body formed centered on an axis with a forwardly open socket shaped to coaxially receive the mounting collar. A collet inside the body has a plurality of jaws with front ends that project axially forward into the collar. The jaws can rock to move the front ends radially outward, or in some situations inward, to engage behind an axially forwardly directed shoulder of the collar and thereby lock the collar to the chuck body. Each jaw can pivot in the body about a respective axis extending in a plane perpendicular to the axis and offset therefrom. An axially displaceable cam sleeve inside the body has a radially directed front cam surface engageable with front inner faces of the front ends of the jaws and a radially oppositely directed rear cam surface engageable with rear faces of rear ends of the jaws. Thus, when displaced axially rearward, the cam sleeve radially shifts the front ends of the jaws to hold the workpiece and, when displaced axially forward, rocks these front ends oppositely to release the workpiece.

It is further known, for example from German utility model 299 21 999 to use the actuating shaft of the collet chuck to axially shift or knock out the tool or workpiece from the chuck after it is released. Thus after moving through enough of a stroke to release the jaws holding the tool or workpiece, the shaft end bumps against the tool or workpiece and pushes it slightly out of the chuck so that it can be grabbed, normally by an automated loading/unloading device.

The problem with these chuck actuators is that they are too fast. They must be pressurized with great force to overcome the pressure of the springs that normally hold the chuck clamped on the tool or workpiece, so that they move rapidly and strike the tool or workpiece forcibly. The result can be axially shifting the tool or workpiece through too great of a distance, so that the automatic loading/unloading device cannot properly grip it, or even so that it actually shoots out of the chuck and drops away.

OBJECTS OF THE INVENTION

It is therefore an object of the present invention to provide an improved chuck actuator.

Another object is the provision of such an improved chuck actuator which overcomes the above-given disadvantages, that is which operates as efficiently as the prior-art systems, but that does not overly displace the tool or workpiece after releasing it.

SUMMARY OF THE INVENTION

A chuck actuator has according to the invention a hollow housing having a chamber extending along an axis and having a front end and a rear end. A ring in the chamber forms with the front end thereof a front compartment and a piston in the chamber between the ring and the rear end forms an intermediate compartment with the ring and a rear compartment with the rear end. An axially extending stem on the piston projecting forward through the ring and through the intermediate and front compartments is adapted to engage and open a chuck and is formed with a region of enlarged diameter. The piston is axially shiftable between a rear position with the enlarged-diameter region offset rearward from the ring and with the stem forming with the ring an axially extending passage between the front and intermediate compartments and a front position with the enlarged-diameter portion fitting snugly in the ring and substantially closing the passage. Ports opening into the compartments serve for pressurizing the rear compartment and depressurizing the front and intermediate compartments for shifting the piston forward at a speed slowing when the front position is reached and for pressurizing the front compartment and intermediate compartments and depressurizing the rear compartment for shifting the position rearward into the rear position.

Thus with this system as the piston is displaced forward, that is into the position engaging the chuck-actuating stem and opening the chuck, it first moves at fairly high speed. Toward the end of its travel, as the enlarged-diameter section fits into the ring and limits fluid flow from the intermediate compartment, such movement slows dramatically so as to gently push the tool or workpiece out of the chuck.

The stem in accordance with the invention is formed immediately forward of the enlarged-diameter region with a forwardly smoothly tapered region so that on forward shifting the piston slows smoothly as the tapered region enters the ring. In addition the ports include a vent port opening into the intermediate compartment. The flow cross section of the vent port can be adjusted, for example by a screw seated in the housing and having a tapered tip engaged in the vent port.

The housing and ring are both of two parts so that the ring can move relative to the housing. Furthermore the housing is provided with front and rear axial abutments spacedly flanking the ring and the ring is axially displaceable between the abutments so that the ring bears against the rear abutment when the front compartment is pressurized more than the intermediate compartment. The ring is formed with a bypass passage that is blocked by the rear abutment when the ring bears thereon. The flow cross section of this bypass passage, when open, is greater than that of the vent passage but smaller than that of the passage formed between the ring and the piston stem. The bypass passage is formed by a plurality of angularly spaced notches cut in the ring. The notches are cut on one face and the outer periphery of the ring. The abutments are spaced such that the ring can only move through an axial stroke of between 0.1 mm and 1.5 mm. To keep it centered, the ring has a tubularly cylindrical collar coaxially surrounding the stem.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
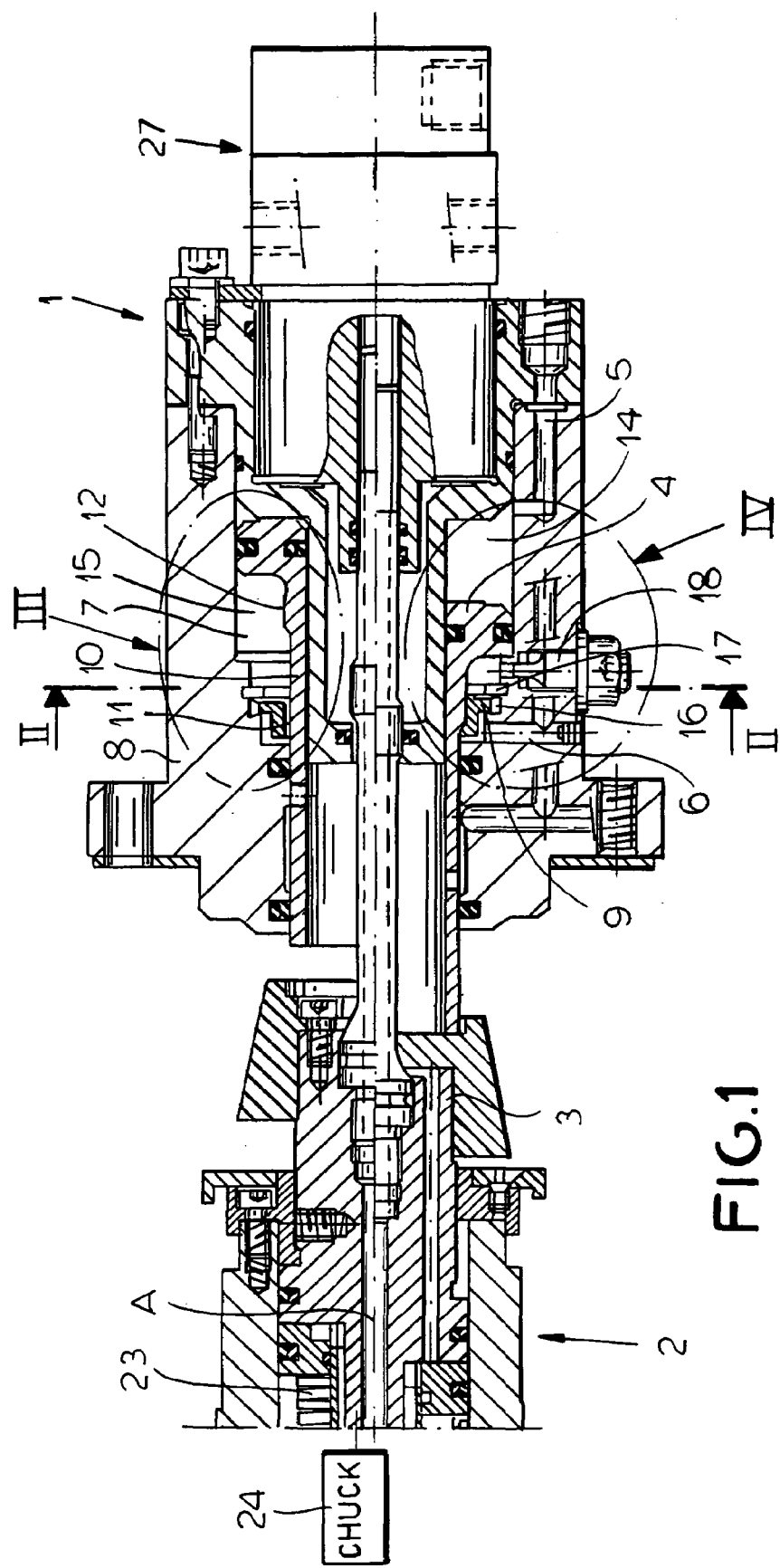
FIG. 1 is an axial section through the apparatus according to the invention.

As seen in FIG. 1 an opening device 1 according to the invention is mounted adjacent a standard collet-chuck actuator 2 having a shaft 3 that can be shifted along an axis A to the left against the force of a stack of spring washers 23 in a housing 24 to act on a chuck shown schematically at 24. In FIG. 1 the region below the axis A shows the parts in the position corresponding to the open position of the chuck 24 and the region above the axis A is the position during machining, that is rotation of the chuck 24. The structure shown at 27 supplies the mechanism with coolant and lubricant through a central passage and conforms generally to the structure shown in U.S. Pat. No. 5,782,586. The connection to the actuator 2 is similar to that shown in above-cited U.S. Pat. No. 5,865,578.

The device 1 has a housing 8 forming a chamber 7 divided by a piston 4 into a back compartment 14 fed from a port 5, a front compartment 15 fed at its extreme front end by a port 6, and an intermediate compartment 16 between the front compartment 15 and the piston 4. Movement of the piston 4 to the left as shown in FIG. 1 by pressurization of the compartment 15 presses a tubular cylindrical extension 10 of the piston 4 against the chuck-actuating shaft 3 to open the chuck 24 and knock a workpiece or tool from it.

Figure 3:
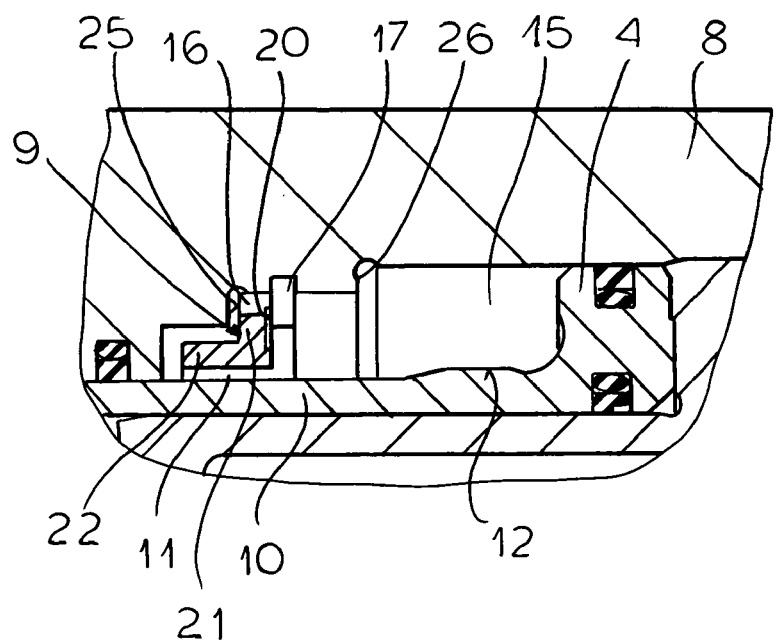
FIGS. 3 and 4 are large-scale views of the details indicated at III and IV in FIG. 1.
Figure 4:
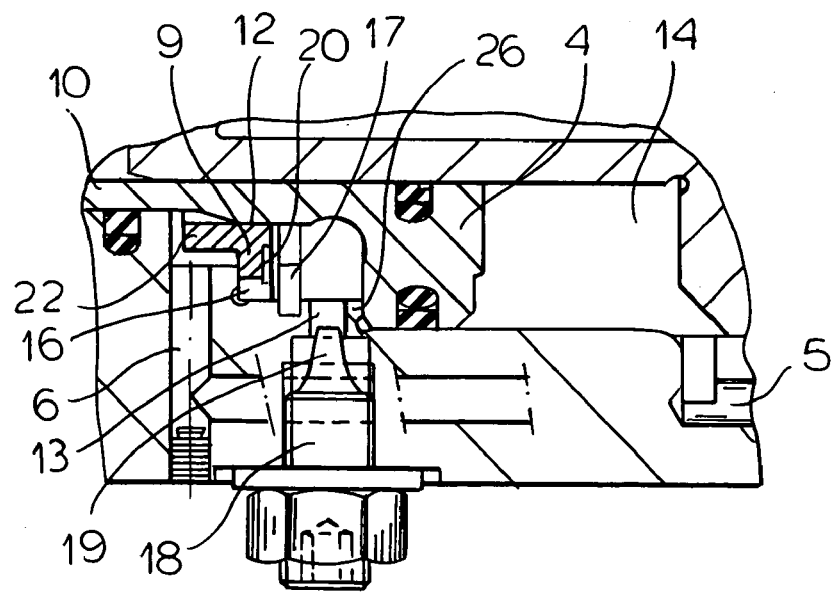

As also shown in FIGS. 3 and 4, the compartments 15 and 16 are separated from each other by an L-section ring 9 forming around the piston extension 10 an annular restriction gap 11 (see FIGS. 3 and 4). The extension 10 has a region 12 of enlarged diameter that tapers frustoconically in both axial directions. When this region 12 is aligned with the ring 9, the gap 11 is blocked. A vent port 13 connected to the port 6 opens into the compartment 15 and has a relatively small flow cross section controlled by a tapered tip 19 of a screw 18 seated in the housing 8.

Figure 2:
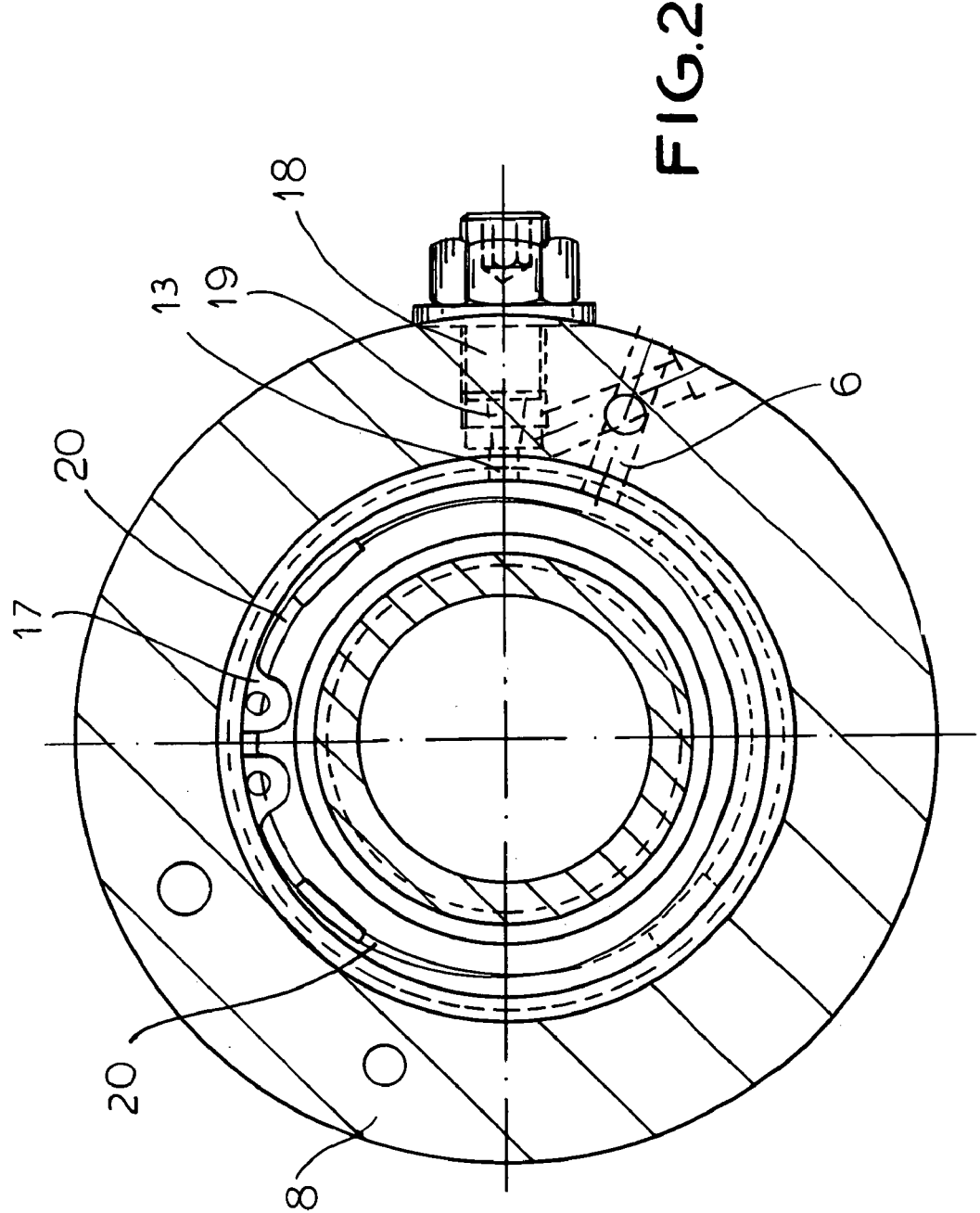
FIG. 2 is a cross section taken along line II—II of FIG. 1.

This ring 9 can shift limitedly axially in the compartment 16 through a stroke of 0.1 mm to 1.5 mm, preferably 0.5 mm, between pair of abutments, here a snap ring 17 (see also FIG. 2) and a shoulder 25 of the housing 8. It has a flange 21 lying in a plane perpendicular to the axis A and flatly engageable with the retaining ring 17 and a tubular flange 22 centered on the axis A and forming the gap 11 with the piston extension 10. The flange 21 is formed on its face turned toward the retaining ring 17 and on its outer periphery with a plurality of notches 20 that form leak passages between the compartments 15 and 16 when the enlarged region 12 is fitted in the flange 22 and the ring 9 is bearing against the ring 17. When the ring 9 is shifted axially oppositely against the shoulder 25 of the housing 8, however, the leak passages formed by the notches 20 are blocked. The flow cross section of these leak passages is substantially greater than that of the vent port 13 and, of course, much less than that of the gap 11 when it is not blocked.

In use pressurization of the compartment 14 via the port 5 will move the piston 4 rapidly to the left, the direction it needs to move in to open the chuck 24. During most of this movement liquid in the compartment 16 will flow rapidly out via the port 6 and liquid in the compartment 15 will flow through the gap 11 into the compartment 16 and thence out through the port 6 and there will be some minor flow out through the vent port 13. Meanwhile the ring 9 will be shifted to the left against the shoulder 25 so that there will be no flow through the notches 20 between the compartments 15 and 16.

As soon as the enlarged region 12 fits into the ring 9 and blocks the gap 11, the compartment 15 will only be able to empty through the very restricted vent port 13, so that movement of the piston 4 will be slowed greatly. The piston 4 will therefore move at a crawl until it seats in the position of FIG. 4 against a shoulder 26 of the housing 8. In this position the chuck 24 is open and the shaft 3 normally has knocked loose the workpiece or tool it is holding.

In order to subsequently lock the chuck 24 on another tool or workpiece, the port 5 is depressurized and the port 6 is pressurized. Pressurization of the compartment 16 shifts the ring 9 off the shoulder 25 so that some flow is possible through the notches 20 from the compartment 16 into the compartment 15, where the pressure can act (along with the force of the springs 23) on the piston 4 to shift it slowly rightward until the enlarged region 12 is pulled out of the ring 9. Thereafter liquid can flow readily from the compartment 16 into the compartment 15 to move the piston 4 rapidly back into its starting position shown in FIG. 3.

I claim:

1. A chuck actuator comprising:
   a hollow housing having a chamber extending along an axis and having a front end and a rear end and provided with front and rear axial abutments;
   a ring axially displaceable in the chamber between the abutments, forming with the front end thereof a front compartment, and formed with a bypass passage that is blocked by the rear abutment when the ring bears thereon;
   a piston in the chamber between the ring and the rear end and forming an intermediate compartment with the ring and a rear compartment with the rear end;
   an axially extending stem on the piston projecting forward through the ring and through the intermediate and front compartments, adapted to engage and open a chuck and knock a tool from it, and formed with a region of enlarged diameter, the piston being axially shiftable between a rear position with the enlarged-diameter region offset rearward from the ring and with the stem forming with the ring an axially extending passage between the front and intermediate compartments and a front position with the enlarged-diameter portion fitting snugly in the ring and substantially closing the passage; and
   means including ports opening into the compartments for
      pressurizing the rear compartment and depressurizing the front and intermediate compartments for shifting the piston forward at a speed slowing when the front position is reached and for
      pressurizing the front compartment and intermediate compartments and depressurizing the rear compartment for shifting the position rearward into the rear position.

2. The chuck actuator defined in claim 1 wherein the stem is formed immediately forward of the enlarged-diameter region with a forwardly smoothly tapered region.

3. The chuck actuator defined in claim 1 wherein the ring has a tubularly cylindrical collar coaxially surrounding the stem.

4. The chuck actuator defined in claim 1, wherein the port opening into the intermediate compartment is a vent port, the actuator further comprising
   means for varying the flow cross section of the vent port.

5. The chuck actuator defined in claim 4 wherein the means for varying includes a screw seated in the housing and having a tapered tip engaged in the vent port.

6. The chuck actuator defined in claim 1 wherein the housing and ring are both of two parts.

7. The chuck actuator defined in claim 1 wherein the bypass passage is formed by a plurality of angularly spaced notches cut in the ring.

8. The chuck actuator defined in claim 1 wherein the abutments are spaced such that the ring can only move through an axial stroke of between 0.1 mm and 1.5 mm.

* * * * *